March 18, 1952  FRANCISCO SANCHEZ MEDINA ET AL  2,589,950
CENTRIFUGAL MOLDING MACHINE
Filed Sept. 17, 1949
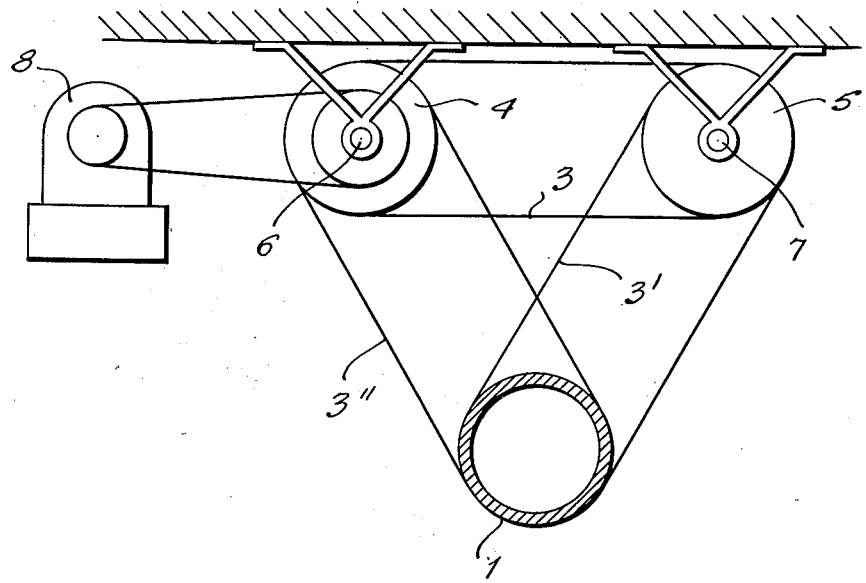
INVENTORS:
Francisco Sanchez Medina,
Luis Muntañola Ley, and
Alberto Muntañola Ley
BY Patented Mar. 18, 1952

2,589,950

UNITED STATES PATENT OFFICE 2,589,950

CENTRIFUGAL MOLDING MACHINE

Francisco Sanchez Medina, Luis Muntañola Tey, and Alberto Muntañola Tey, Barcelona, Spain Application September 17, 1949, Serial No. 116,399
In France August 30, 1949

1 Claim. (Cl. 25—30)

The present invention refers to a new centrifugal-machine for making or manufacturing centrifugally treated elements, articles or objects of concrete, such as tubes, posts, small beams, joists, girders, etc., by which the manufacture or fabrication is simplified, the making or production is considerably cheapened, the cost of the necessary machinery used is also much reduced, the production is improved and in general the production of such elements or articles is greatly increased.

The centrifugal-machines actually employed or used at present for making tubes, posts, beams, joists or girders and other similar objects or elements made of concrete, fibro-cement or any other materials capable of being treated by a centrifugal-machine, do not operate satisfactorily.

It is the object of the present invention to reduce the cost of the machine, facilitate the operations of charging and discharging, and those of centering a mould.

The fundamental essence or principle of the new centrifugal-machine of the present invention rests in the fact that in the new centrifugal-machine which is the object of the present invention, the movement or action is totally and purely tangential, and is obtained by simply placing the mould on, or having it supported by, flexible revolving or rotating belts or similar elements, either elastic or not, which serve as its supporting bed or foundation, by which means, on turning or revolving, the centering or coincidence between the physical axis of the said mould with its axis of rotation is attained, being automatically obtained and always precise and exact although the relative position of this axle with respect to that of the elements or means of action should vary; moreover, the weight of the mould itself, and that of the material contained in it, take part in and strengthen the centering, by the law of centrifugal stability, and in consequence, eliminating a great part of the vibrations, due to the flexibility of the supporting bed or foundation of the mould.

The concrete solution of the essence or fundamental principle of the invention may certainly vary considerably and be very varied without by so doing, in any way affecting the said essence or fundamental principle. In fact, for the legal effects of the patent hereby applied for, any kind of constructive details may be variable which do not affect, alter, change or modify the said essence or fundamental principle of the centrifugal-machine herein described.

For the better understanding of this descriptive memorial a drawing is attached in which a preferred embodiment of the invention is illustrated by way of example in a schematic side view.

The mould 1 which is cylindrical and hollow, with its bases protected by flanged rings so as to retain the mixture or liquid paste in the mould and thus obtain the desired thickness of the object or piece being made, is simply placed resting on the elements that constitute its foundation or bed, bands, cables or belts 3 placed or arranged between the series of pulleys 4 and 5 mounted on the parallel axles or shafts 6 and 7 worked or driven by the motor 8.

The length of the elastic elements or belts 3, which unite or join the pulleys 4 and 5 in each transverse or cross section, is the same, but they must remain slack so that the mould 1, by its own weight and also that of the material which is being centrifugally treated, resting on them makes them tense; the mould being sustained or supported hanging inside the loops and being rotated by the tagential action of the belts or elements 3, and its own weight will force it to remain centered between 6 and 7; and as it will revolve freely, this turning will be effected around its mathematical axis, and although during the first few turns, and until the mixture or paste becomes stuck or fixed to the inner surface of the mould, this latter may become slightly displaced or may experience some slight oscillations on its elastic bed or foundation, these movements, not being forced by rigid parts or elements, will not possess any comparable proportion in their amount to the speed of rotation or revolving and will not affect in any way whatever, the centrifugal distribution of the paste or mixture that has been placed inside the mould.

In this way, the distribution and the depositing of the material upon the walls of the mould will be effected rapidly and perfectly, collaborating and helping to maintain a perfectly staple axis of rotation.

With one machine of the maximum useful length of support, pieces of different lengths may be manufactured by suitably arranging the two series of pulleys 4 and 5. Moreover, there may be produced in the said machine tubes or other pieces of very variable transverse sections, up to a limit imposed by the maximum space that the two series of pulleys can be separated.

The charging or filling of mixture or paste into the mould may be done simply by using a spade or shovel and introducing the paste or mixture through both ends or through one end only; or by means of hoppers placed at a suitable height.

It is also of interest to state here, that lateral guides may be placed in the centrifugal machine in order to limit the longitudinal or angular deviation of the mould on beginning to rotate, and buffers or stops may be placed very near to both ends of the mould to keep it in position during its centrifugal movement or motion, thus avoiding its leaving its flexible bed.

Finally it may be added that as it is of great interest to obtain a good regulation of the speed, which is from every point of view necessary for centrifugal treatment, there may be interposed or intercalated, between the motor and the centrifugal-machine, an adequate and suitable device, of a mechanical or electrical type.

What we claim as new and desire to secure by Letters Patent is:

An apparatus for manufacturing by centrifugal force pipes, and like hollow bodies of mouldable materials, comprising in combination, supporting means; bearing means supported by said supporting means; two parallel shafts rotatably mounted in said bearing means spaced from each other; means operatively connecting said two shafts for rotation at the same speed; driving means operatively connected to one of said two shafts for driving the same; a first set of pulleys fixedly mounted in spaced relationship on one of said shafts; a second set of pulleys fixedly mounted in spaced relationship on the other of said two shafts, the pulleys of said first set being staggered in relation to the pulleys of said second set; a first set of endless bands arranged on said first set of pulleys and driven thereby; and a second set of endless bands arranged on said second set of pulleys and driven thereby, said endless bands being adapted to form elongated loops when stretched by the weight of a tubular mould placed inside said endless bands, one end of the elongated loop formed by each endless band extending about a corresponding pulley, said endless bands being of such length that the other end of each elongated loop of each endless band is adapted to extend about the tubular mould arranged parallel to, below, and intermediate said two shafts and to support the same so that said tubular mould is supported by said two sets of endless bands extending at an angle to each other and tensions the same so as to be rotated by said endless bands driven by said pulleys, and is prevented from lateral movement in one direction by said first set of endless bands, and from lateral movement in an opposite direction by said second set of endless bands.

FRANCISCO SANCHEZ MEDINA.
LUIS MUNTAÑOLA TEY.
ALBERTO MUNTAÑOLA TEY.

REFERENCES CITED

The following references are of record in the file of this patent:

UNITED STATES PATENTS

| Number | Name | Date |
|---|---|---|
| 1,427,508 | Amphlett et al. | Aug. 29, 1922 |
| 1,837,324 | Hume | Dec. 22, 1931 |

FOREIGN PATENTS

| Number | Country | Date |
|---|---|---|
| 836,050 | France | Oct. 10, 1938 |